M. A. DILLEY.
Hay Loader.
No. 68,855.
2 Sheets—Sheet 2.
Patented Sept. 17, 1867.
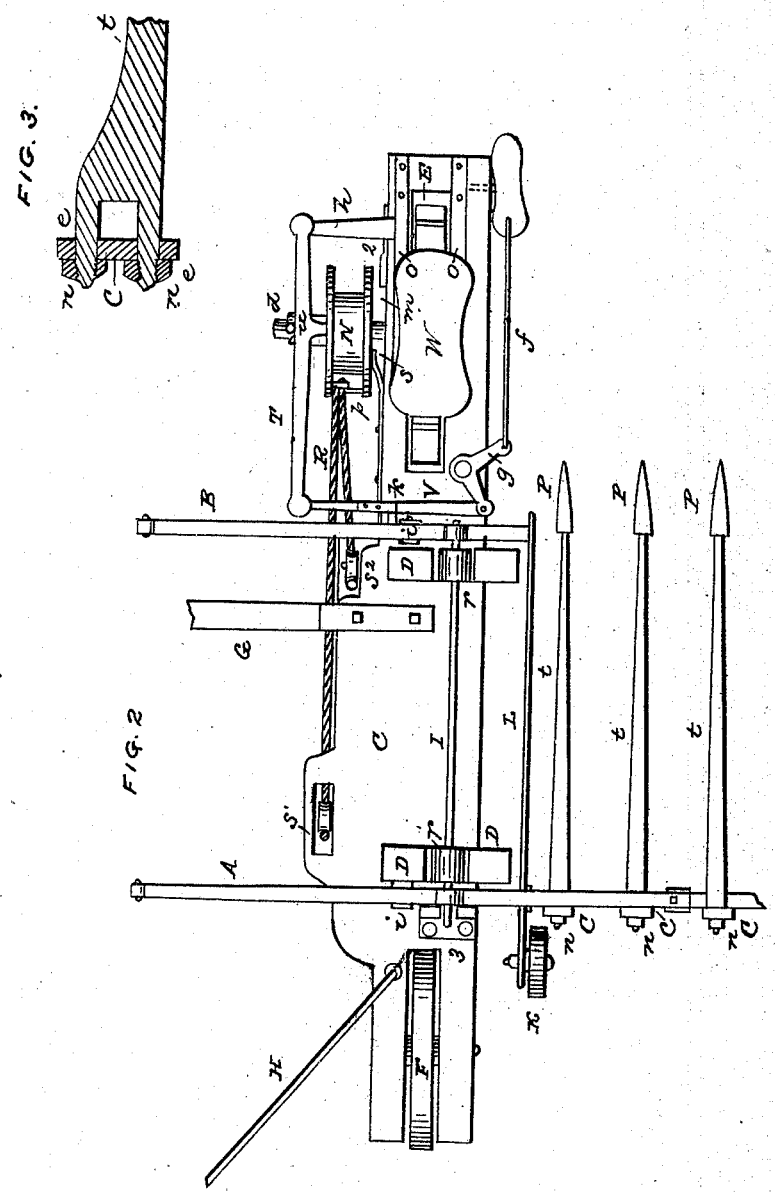
WITNESSES:
Bracy Ybey
L. H. Goodrich
INVENTOR.
Martin A Dilley.

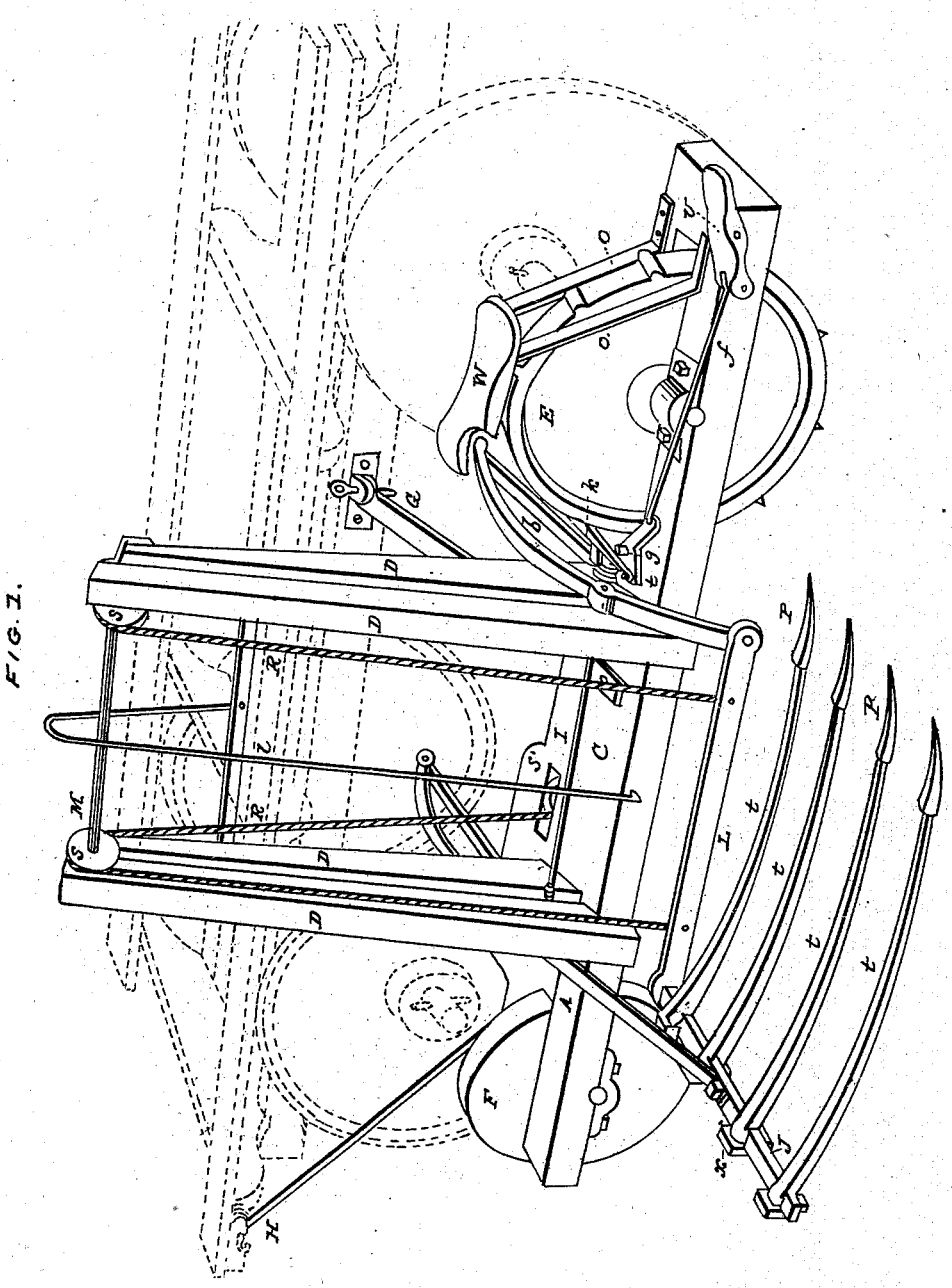

United States Patent Office.

MARTIN A. DILLEY, OF MENDON, MICHIGAN.

*Letters Patent No. 68,855, dated September 17, 1867.*

---

IMPROVEMENT IN HAY-LOADERS.

---

The Schedule referred to in these Letters Patent and making part of the same.

---

TO ALL WHOM IT MAY CONCERN:

Be it known that I, MARTIN A. DILLEY, of Mendon, in the county of St. Joseph, and State of Michigan, have invented certain new and useful Improvements in Machines for Loading Hay automatically in the field; and I do hereby declare that the following is a full, clear, and exact description of the construction and operation of the same, reference being had to the annexed drawings, making a part of this specification, in which—

Figure 1 is a perspective view.

Figure 2 is a plane view, the upper parts of the derrick-posts being cut away.

Figure 3 is an enlarged section in the line $x$, exhibiting the fork tine connection.

Similar letters of reference indicate corresponding parts in all the figures.

My invention relates to an improved arrangement of parts connected with the hay-fork and with a derrick-frame mounted on wheels, which frame is attached temporarily to one side of a wagon, and, as it is drawn over the field, collects and pitches the hay automatically; and the better to enable others skilled in this branch of agricultural mechanism to construct the same, I will now proceed to describe it.

C represents the bed, and D the uprights of a wooden derrick-frame, mounted on two wheels, E and F, which revolve in a slotted space at each end of the bed. I usually frame the uprights to the bed at a convenient distance from each other, in pairs, so as to incline toward the wagon, to which the derrick is to be temporarily attached by a bent lateral brace-bar, G, and angular stay H, one end of each being permanently secured to the bed, and the other to the wagon, by pins passing through ears, or in any other convenient way. I frame the two uprights, composing a pair, a proper distance apart to receive between a guide-rod, I, usually provided with rollers, $r$, to diminish friction, which guide-rod is connected with a pair of hinged tilting-bars, marked respectively A $a$ and B $b$, to be hereinafter more fully described. J is a square or flat bar of iron, constituting the fork-head, to which I attach the tines $t$, as seen in fig. 3, by slotting the head end of the tine, and inserting snugly therein the head-bar, the bifurcated projections $e$ $e$ being rounded and threaded to receive a short clamp, $c$, and nuts $n$, by means of which the tine is drawn up firmly and secured to the bar. To the inner end of the fork-head J, and at a right angle with the same, I attach a lifting-bar, L, furnished with a bent arm carrying a small wheel, K. The hoisting-rope R passes over pulley-sheaves S on a hoisting-shaft, M, hung to the upper end of the uprights, as follows: One end of the rope is secured to the lifting-bar near the fork-head, and passes upwards over one pulley, and down to and under a sheave, $s^1$, hung to the side of the derrick-bed, thence horizontally over a pin, $p$, secured to the flanges of a loose winding-drum, N, and back under another sheave, $s^2$, and upwards over the other pulley on the shaft M, down to the projecting end of the bar L, where it is secured. The upper tilting-bar A extends down to about the middle of the fork-head, where it is clamped or otherwise secured, and the other one, B, is bowed downwards, and firmly attached against one side of the lifting-bar at its extreme end. The inner ends of both these bars project, when in place, laterally under the wagon-rack and are hinged to shorter straight portions, $a$ $b$, pivoted to ears $i$ on the derrick-bed. The axle $m$, to which the driving-wheel E is keyed, projects beyond its inner bearing to receive the loose winding-drum N, which is furnished with a boss journal, $j$, hung in a bearing in a lever hanger, T. The annular end of said journal is formed with clutch-projection $d$, to engage with a pin driven through the projecting end of the axle aforesaid in such a manner that said winding-drum can be clutched or unclutched with the driving-axle $m$ by a sliding end movement thereon. I support the driver's seat W on two standards, O, immediately over the driving-wheel, to produce, by additional weight, in connection with the ribs on the wheel rim, an effective bite on the ground, and for other uses, as will hereinafter more fully appear. One end of the hanger T is jointed to an arm, $h$, and the other end, through the intervention of a vibrating elbow, $g$, and jointed connecting-bar V, and rod $f$, connects with an oscillating treadle, U, pivoted to one side of the bed-frame, a stirrup-iron being used in the side opposite. One or more bent rods, $l$, may be employed, as seen, to prevent spilling the hay on the derrick-bed while being lifted and tilted on the wagon.

I will now describe the remaining parts in explaining the mode of operation. When the machine is connected with the wagon in the hay-field ready to commence, substantially as described, the operator in his seat presses with his heel against the treadle, so as to keep the winding-drum unclutched, starts the team in motion, and directs it in such a manner as to enter the tines of the fork (protected by curved guard-points P, which slide along the ground,) under a cock of hay. As soon as the cock is fairly loaded on the fork, he ceases pressing with his heel, when the spring s forces the winding-drum in gear with the clutch-pin, and the drum revolves and winds up the rope and lifts the forkful of hay, its course being governed by the guide-rod between the uprights. When the fork is hoisted as far as designed, the portions of the tilting-bar will have assumed an approximate right line with each other, and the fork will be tilted over so as to discharge its load on the wagon, where it is spread in the ordinary way. As the fork is being fully tilted, the pivoted portion of the bar b will strike against a stop, k, on the connecting-bar V, and unclutch the winding-drum, when the empty fork will descend by its own gravity and unwind the rope, the operator easing it down to the ground by pressing his heel again on the treadle, which causes the spur u to press the opposite side of the winding-drum against a block marked 2, which serves as a brake to control the velocity of the fork's descent to the ground, when the machine is ready to repeat the operation. To aid in resisting sudden end pressure on the fork, I usually attach a stop, 3, for the bar A to abut against; and in regard to the guard-points P, I will merely say that I form them with blunt, round curved points to enable them to slide readily over any obstacle on the ground, and I fasten them on the ends of the tines in any convenient way.

I do not claim broadly loading hay automatically by a derrick connected with the wagon-rack to be loaded; but, having described my invention, what I do claim, and desire to secure by Letters Patent, is—

1. I claim the arrangement and combination of the hinged tilting-bars A a B b, and guide-rod I, with the hay-fork, and with its lifting-bar L, automatic stop k, and derrick-frame, substantially in the manner described.

2. I claim connecting the fork-tines t to the head-bar J' by threaded bifurcated ends e, short clamps c, and nuts n, substantially as set forth.

3. I claim the driver's seat W, placed over the driving-wheel, the axle of which carries a winding-drum N, in combination with an oscillating foot-treadle, U, connected and arranged so that the driver, with his foot, may control the ascent and descent of the fork, in the manner substantially as herein specified.

4. I claim the guard-points P, in combination with the fork-tines t, substantially as and for the purpose herein described.

MARTIN A. DILLEY.

Witnesses:
BRACEY TOBEY,
L. H. GOODRICH.